Jan. 14, 1969     J. RICHMOND ETAL     3,422,340
HIGH VOLTAGE RECTIFIER STACK ASSEMBLY HAVING
CENTRALLY SUPPORTED CAPACITOR
Filed April 26, 1967     Sheet 1 of 2
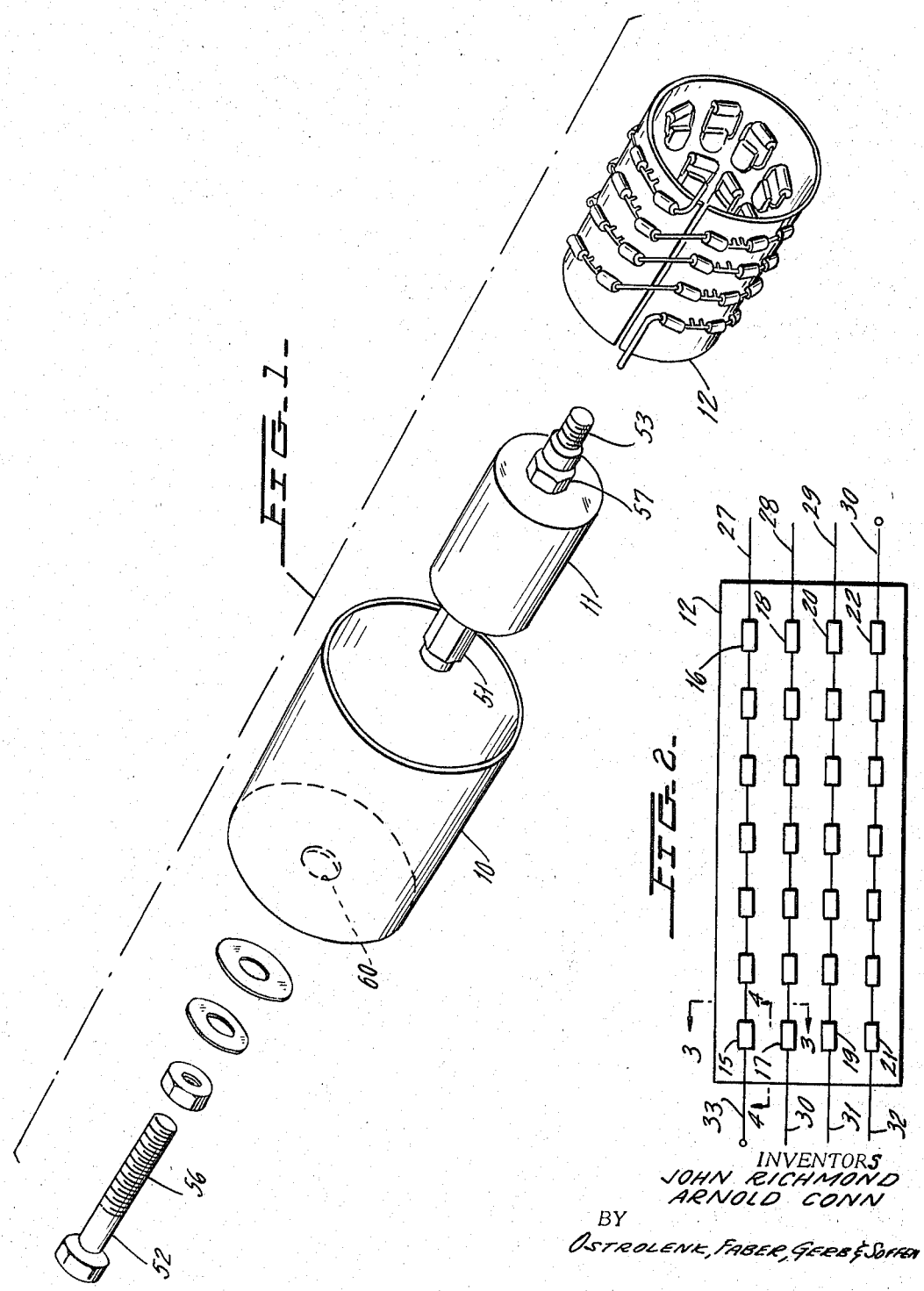
INVENTORS
JOHN RICHMOND
ARNOLD CONN
BY
OSTROLENK, FABER, GERB & SOFFEN
ATTORNEYS

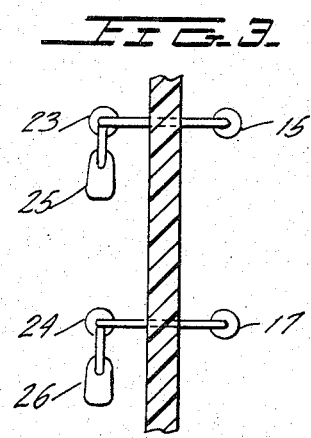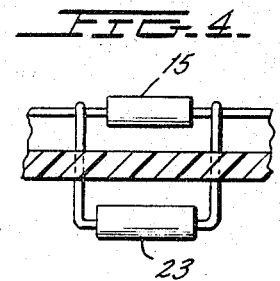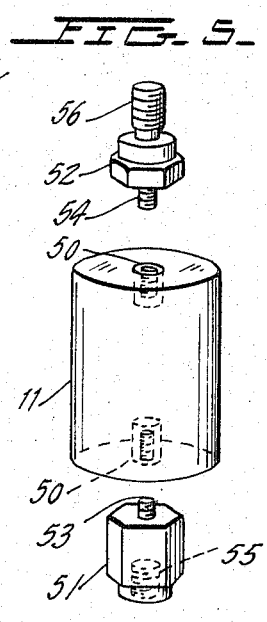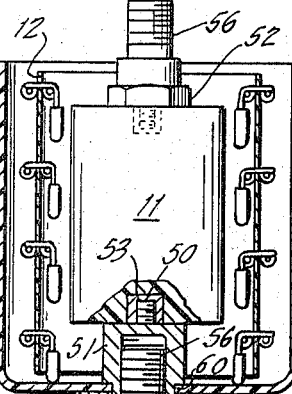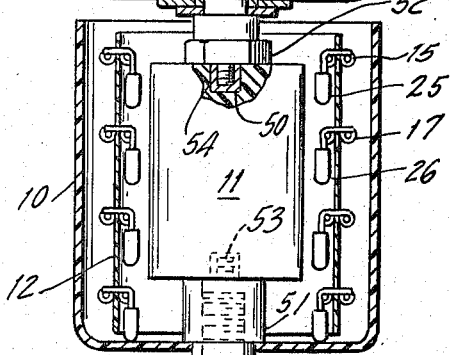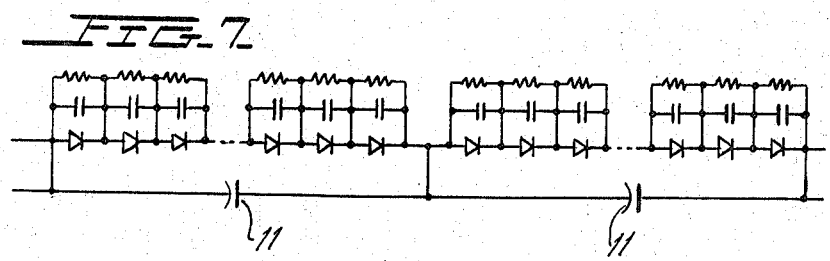

United States Patent Office 3,422,340
Patented Jan. 14, 1969

3,422,340
HIGH VOLTAGE RECTIFIER STACK ASSEMBLY HAVING CENTRALLY SUPPORTED CAPACITOR
John Richmond, Playa Del Rey, and Arnold Conn, Lawndale, Calif., assignors to International Rectifier Corporation, El Segundo, Calif., a corporation of California
Filed Apr. 26, 1967, Ser. No. 633,969
U.S. Cl. 321—11                        6 Claims
Int. Cl. H02m 1/18

ABSTRACT OF THE DISCLOSURE

A high voltage stack comprised of series-connected rectifier elements, each having respective parallel-connected resistors and capacitors, are mounted on a flat insulation sheet. This sheet is coiled into a cylinder and is mounted coaxially with a central main capacitor within an insulation cup. Mounting bolts connected to the central capacitor and passing through the bottom wall of the cup serve as terminals for the device and as mechanical mounting means for mechanically and electrically connecting to adjacent cup assemblies whereby a plurality of such assemblies can be connected in series to obtain any desired voltage rating.

This invention relates to high voltage rectifier assemblies, and more particularly relates to a novel high voltage assembly formed of a plurality of rectifier elements connected in series and mounted on an insulation sheet which is coiled to a cylindrical form. The cylindrical form is inserted into an insulation cup and a capacitor is centrally mounted within the cup and within the form. The capacitor has threaded connection means extending through its opposite ends, one of which passes through the bottom of the insulation cup whereby a plurality of rectifier subassemblies can be connected in series mechanically and electrically by virtue of these threaded structures. Thus, an assemblage of as many such assemblies as needed, or by building up in a stack formed with the central capacitor of each of the insulation cups, serves to distribute voltage transient equally along the stack.

Accordingly, it is a primary object of this invention to provide a novel and inexpensive subassembly component for a high voltage rectifier system.

Another object of this invention is to provide an inexpensive structure for high voltage assemblies.

Yet a further object is to provide a subassembly for high voltage rectifier systems which contains its own main capacitor and means for automatically and simply connecting large groups of subassemblies to one another to form the completed system.

These and other objects of this invention will become apparent from the following description when taken in connection with the drawings, in which:

FIGURE 1 is an exploded perspective view of one of the subassemblies of the present invention.

FIGURE 2 illustrates a front plan view of an insulation sheet which contains a plurality of rectifiers on one surface with their respective resistors and capacitors on an opposite surface.

FIGURE 3 is a cross-sectional view of FIGURE 1 taken across the section lines 3—3 in FIGURE 2 to better illustrate the parallel-connected resistors and capacitors for each of the respective diodes seen in FIGURE 2.

FIGURE 4 is a sectional view of FIGURE 2 taken across the sectional lines 4—4 in FIGURE 2.

FIGURE 5 is an exploded perspective view of the capacitor used in FIGURE 1.

FIGURE 6 is a cross-sectional view illustrating the connection between two subassemblies of the type shown in FIGURE 1.

FIGURE 7 is a circuit diagram illustrating the series connection of the components of two subassemblies constructed in accordance with the present invention.

Referring first to FIGURE 1, there is illustrated therein an insulation cup 10 which receives a capacitor 11 and a cylindrical sheet 12 which carries a plurality of small series-connected rectifiers having parallel-connected resistors and capacitors thereon. The insulation cylinder 12 is schematically illustrated in FIGURE 6 as concentrically positioned with respect to capacitor 11 within the cup 10. Sheet 12, which can be of a suitable flexible insulation material, is shown in the flat in FIGURE 12 and carries on one surface thereof four rows of series-connected rectifier elements. For example, the first row includes end diodes 15 and 16; the second row includes end diodes 17 and 18; the third row includes end diodes 19 and 20; and the last row includes end diodes 21 and 22. The bottom surface of insulating sheet 12 receives a plurality of resistors and capacitors for each of the various diodes on the front surface with the leads interconnected by projecting through openings formed in appropriate locations in the insulating sheet 12.

Thus, as seen in FIGURE 3, diodes 15 and 17 are provided with parallel-connected resistors 23 and 24, respectively, and parallel-connected capacitors 25 and 26, respectively. Diode 15 and it parallel-connected resistor can also be seen in the sectional view of FIGURE 4. The leads of the adjacent diodes of each row are also electrically connected together, thereby defining a series connection of a large number of diodes such as fifteen diodes per row, each of which has its own parallel-connected resistor and capacitor, with these components all being directly supported by their leads from the insulating sheet 12. The insulating sheet 12 is then coiled into a cylindrical form and the right-hand leads 27, 28 and 29 of diodes 16, 18 and 20 are soldered or brazed to the left-hand leads 30, 31 and 32 of diodes 17, 19 and 21, respectively. This soldering operation also retains sheet 12 in the coiled form shown in FIGURE 1. The end leads 33 and 34 of diodes 15 and 22, respectively, then serve as the terminals for the series connection of the various rows of diodes that is accomplished after the insulation form coiling operation and securement of leads 27 through 29 to leads 30 to 32. Obviously, any number of rows of diodes could be used, depending upon the number of diodes which are to be connected in series with the subassembly. The capacitor 11 may be of a standard high voltage capacitor having a capacitance of 360 micro-microfarads. Each of the individual shunting resistors and shunting capacitors may have respective resistances and capacitances of 4.7 megohms and .0022 microfarad, respectively. The diodes used in the series array may be of various types such as type 10B8 manufactured by the International Rectifier Corporation. When using fifteen of these diodes per row and four rows such as illustrated in FIGURE 2, the total PRV of the subsequently formed subassembly will be 50 kilovolts peak. The main capacitor 10 is formed with two tapped insert terminals at its opposite ends. The upper terminal is seen in FIGURE 5 as tapped terminal 50.

Brass hexagonal threaded members 51 and 52 are then provided, each having threaded connection portions 53 and 54, respectively, which are threadedly connected to the internal tapped openings of capacitor 11. The outer portions of hexagonal connector members 51 and 52 then contain an internal tapped opening 55 and externally threaded body 56, respectively. The thread diameter for the threads 55 and 56 are substantially equal so that the thread 56 can be threaded into tapped opening 55.

In the assembly of the device as shown best in FIGURE 6, the capacitor 11 and coil insulation form 12 carrying the various components are inserted into cup 10. The lower hexagonal brass conductor 51 stems through an opening 60 in the cup 10 and its internal threaded opening receives either a threaded brass terminal bolt or, as shown in FIGURE 6, the threaded end 56 of the upper brass conductor member 52 of an adjacent subassembly. At the same time, the end leads, such as leads 33 and 34 of FIGURE 2, are connected to the opposite ends of the capacitor 11 within the cup 10. In this manner, any number of subassemblies can be connected in series to form a high voltage stack of virtually any desired voltage rating.

The electrical circuit defined by the two assembled stacks is illustrated in FIGURE 7 for two subassemblies each having a plurality of series-connected diodes which are each provided with parallel-connected resistors and capacitors, and each having its own parallel-connected main capacitor 11 for distributing high rising voltages across each of the full subassemblies.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high voltage rectifier stack comprising a plurality of rectifier elements mounted on a hollow cylindrical insulation sheet and connected in series with one another and an insulation cup having an open end and a closed end, and a cylindrical capacitor; threaded male and female connection members connected to the opposite ends, respectively, of said cylindrical capacitor and coaxial with said cylindrical capacitor; an opening in the center of said closed end of said insulation cup; said cylindrical capacitor fixed in the interior of said insulation cup and coaxially with said insulation cup; one of said male or female connection members extending through said opening; said hollow cylindrical insulation sheet positioned within said insulation cup and surrounding said cylindrical capacitor.

2. The device of claim 1 wherein the first and last rectifier elements of said plurality of series connected elements have extending terminal leads; said cylindrical capacitor having first and second terminals at the opposite ends thereof; said terminal leads of said first and second rectifier elements connected to said first and second terminal leads, respectively; said first and second terminal leads connected to said male and female connection members, respectively.

3. The device as set forth in claim 2 wherein the other of said male or female connection member extends beyond the said open end of said insulation cup.

4. The device as set forth in claim 2 wherein said plurality of rectifier elements have respective parallel connected resistors and capacitors; said plurality of rectifier elements defining a general spiral around the periphery of said insulation cylinder.

5. The device as set forth in claim 4 wherein said parallel resistors and capacitors extend from a first surface of said hollow insulation cylinder and said plurality of rectifier elements extend from the opposite surface of said hollow insulation cylinder.

6. The device as set forth in claim 3 which includes a second identical device; said one of said male or female connection members extending through said opening threaded into the other of said male or female connection members extending beyond the open end of said second device.

References Cited

UNITED STATES PATENTS

| 2,984,773 | 5/1961 | Guldemond et al. | 321—8 |
| 3,335,339 | 8/1967 | Schuler | 317—234 |

JOHN F. COUCH, *Primary Examiner.*

W. H. BEHA, JR., *Assistant Examiner.*

U.S. Cl. X.R.

317—234